(12) United States Patent
Sato

(10) Patent No.: US 8,760,890 B2
(45) Date of Patent: Jun. 24, 2014

(54) CURRENT SOURCE INVERTER

(75) Inventor: Shinji Sato, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 104 days.

(21) Appl. No.: 12/967,882

(22) Filed: Dec. 14, 2010

(65) Prior Publication Data

US 2011/0157948 A1      Jun. 30, 2011

(30) Foreign Application Priority Data

Dec. 28, 2009  (JP) ................................. 2009-297859

(51) Int. Cl.
   *H02M 7/5387*   (2007.01)
(52) U.S. Cl.
   USPC ...................................................... 363/56.02
(58) Field of Classification Search
   USPC ........... 361/56, 18, 23, 28, 29, 30, 31, 33, 88,
         361/89, 90, 91.1, 91.4; 363/37, 132, 142,
         363/55, 56.01, 56.02, 56.03, 56.04, 56.06,
         363/56.07, 56.08
   See application file for complete search history.

(56) References Cited

U.S. PATENT DOCUMENTS

| | | | | |
|---|---|---|---|---|
| 5,121,283 A | * | 6/1992 | Ibori et al. | 361/93.1 |
| 5,764,024 A | * | 6/1998 | Wilson | 318/805 |
| 6,683,798 B2 | * | 1/2004 | Matsuura et al. | 363/17 |
| 7,518,430 B2 | * | 4/2009 | Dequina et al. | 327/381 |
| 2009/0154201 A1 | * | 6/2009 | Ecrabey et al. | 363/37 |
| 2009/0290276 A1 | * | 11/2009 | Carcouet et al. | 361/93.9 |
| 2010/0309589 A1 | * | 12/2010 | Ueki et al. | 361/18 |

FOREIGN PATENT DOCUMENTS

| | | |
|---|---|---|
| JP | 5-236756 | 9/1993 |
| JP | 08-223905 | 8/1996 |
| JP | 2006-223032 | 8/2006 |
| JP | 2008-182884 | 8/2008 |
| JP | 2010-220303 | 9/2010 |

OTHER PUBLICATIONS

Japanese Office Action issued on Nov. 29, 2011 in patent application No. 2009-297859 (with English outline of Office Action).

* cited by examiner

*Primary Examiner* — Gary L Laxton
*Assistant Examiner* — Alex Torres-Rivera
(74) *Attorney, Agent, or Firm* — Oblon, Spivak, McClelland, Maier & Neustadt, L.L.P.

(57) ABSTRACT

A current source inverter includes an inverter having arm units and AC terminals, the numbers of the arm units and AC terminals being adapted to an AC load connected to the AC terminals. An upper arm is connected between a positive DC terminal and the corresponding AC terminal and has an upper arm switch Q7 (Q2, Q3) and an upper arm diode. A lower arm is connected between a negative DC terminal 5 and the corresponding AC terminal and has a lower arm switch Q8 (Q5, Q6) and a lower arm diode. The apparatus also includes a smoothing reactor and a DC power source that are connected in series between the positive DC terminal and the negative DC terminal, and includes drivers to control ON/OFF of the upper and lower aim switches to output AC power. The switches Q7 and Q8 are each a normally-ON switch.

2 Claims, 3 Drawing Sheets

US 8,760,890 B2

CURRENT SOURCE INVERTER

BACKGROUND OF THE INVENTION

1. Field of the Invention

The present invention relates to a current source inverter for changing DC power into three-phase AC power, and particularly, to a technique of safely and surely stopping the current source inverter when an abnormality occurs.

2. Description of the Related Art

Power inversion apparatuses for changing DC power into AC power are used for motor driving inverters, uninterrupted power sources, power factor correction circuits, and the like. The power inversion apparatuses are generally classified into voltage source (voltage-type) inverters having a DC link unit provided with a smoothing capacitor and current source (current-type) inverters having a DC link unit provided with a smoothing reactor.

FIG. 1 is a circuit diagram illustrating an example of the current source inverter according to a related art. In FIG. 1, a positive pole of a DC power source 1 is connected through a smoothing reactor 2 to a positive DC terminal 4 and a negative pole of the DC power source 1 is connected to a negative DC terminal 5.

An AC load 3 is a three-phase load having three AC terminals 6, 7, and 8. Connected between the positive DC terminal 4 and the AC terminal 6 is a series circuit including an insulated gate bipolar transistor (IGBT) Q1 and a diode D1. Connected between the positive DC terminal 4 and the AC terminal 7 is a series circuit including an IGBT Q2 and a diode D2. Connected between the positive DC terminal 4 and the AC terminal 8 is a series circuit including an IGBT Q3 and a diode D3.

Connected between the negative DC terminal 5 and the AC terminal 6 is a series circuit including an IGBT Q4 and a diode D4. Connected between the negative DC terminal 5 and the AC terminal 7 is a series circuit including an IGBT Q5 and a diode D5. Connected between the negative DC terminal 5 and the AC terminal 8 is a series circuit including an IGBT Q6 and a diode D6.

Gate drivers 11 to 16 are arranged for the IGBTs Q1 to Q6, respectively. Each of the gate drivers 11 to 16 is connected between a gate and an emitter of the corresponding IGBT, to apply a gate signal to the IGBT and thereby turn on the same.

Operation of the current source inverter of FIG. 1 will be explained. When the gate driver 11 (12 to 16) applies a gate signal of, for example, +15 V between the gate and emitter of the IGBT Q1 (Q2 to Q6), the IGBT turns on. When the gate driver 11 (12 to 16) applies a gate signal of, for example, 0 V or a negative voltage between the gate and emitter of the IGBT Q1 (Q2 to Q6), the IGBT turns off.

Based on control signals (3-phase, 120-degree conduction system) from a control circuit (not illustrated), the gate drivers 11 to 16 turn on/off the IGBTs Q1 to Q6, thereby supplying a required current to the AC load 3.

More precisely, the IGBTs Q1 and Q5 turn on at certain time (0-degree phase), to pass a current from the AC terminal 6 to the AC load 3 and to the AC terminal 7. At 60-degree phase, the IGBTs Q1 and Q6 turn on to supply a current from the AC terminal 6 to the AC load 3 and to the AC terminal 8.

At 120-degree phase, the IGBTs Q2 and Q6 turn on to supply a current from the AC terminal 7 to the AC load 3 and to the AC terminal 8. At 180-degree phase, the IGBTs Q2 and Q4 turn on to supply a current from the AC terminal 7 to the AC load 3 and to the AC terminal 6.

At 240-degree phase, the IGBTs Q3 and Q4 turn on to supply a current from the AC terminal 8 to the AC load 3 and to the AC terminal 6. At 300-degree phase, the IGBTs Q3 and Q5 turn on to supply a current from the AC terminal 8 to the AC load 3 and to the AC terminal 7.

Another related art described in Japanese Unexamined Patent Application Publication No. H05-236756 discloses a protection apparatus for a current source inverter.

According to this related art, the current source inverter has a rectifying unit to rectify power from an AC power source, an inverting unit to change a direct current outputted from the rectifying unit into a high-frequency alternating current, a DC reactor connected between the inverting unit and the rectifying unit, to smooth DC ripple components, and a load to receive the high-frequency alternating current from the inverting unit. In the current source inverter, the load is a parallel resonant circuit and the inverting unit employs self-turn-off elements. Each arm of the rectifying unit is a series circuit including a self-turn-off element and a diode. Between a positive pole and a negative pole on the output side of the rectifying unit, a diode is connected with a cathode thereof connected to the positive pole and an anode to the negative pole.

With the use of the self-turn-off elements for the rectifying unit, this related art stops a current to the DC reactor simultaneously with a blockage of gates. The diode connected to the output of the rectifying unit forms a flywheel circuit to reduce an overcurrent duty of the self-turn-off elements in the inverting unit.

SUMMARY OF THE INVENTION

If the control circuit (not illustrated) of the related art illustrated in FIG. 1 malfunctions, or if the gate drivers 11 to 16 cause an abnormality, the current source inverter must be inoperative. In the case of a voltage source inverter, IGBTs are turned off and the apparatus becomes inoperative.

In the case of the current source inverter illustrated in FIG. 1, the IGBTs Q1 to Q3, for example, must not simultaneously be turned off because, if they are turned off at the same time, energy accumulated in the smoothing reactor 2 finds no exit and destroys the IGBTs Q1 to Q3. Due to the same reason, the IGBTs Q4 to Q6 must not simultaneously be turned off. One of the IGBTs Q1 to Q3 and one of the IGBTs Q4 to Q6 must be kept ON. To turn on the IGBTs Q1 to Q6, the gate drivers 11 to 16 are required to output a positive voltage. If an abnormality occurs in the gate drivers 11 to 16, the related art is unable to turn on the IGBTs Q1 to Q6, and therefore, is unable to safely stop the current source inverter.

The protection apparatus for a current source inverter described in Japanese Unexamined Patent Application Publication No. H05-236756 also has problems similar to those of the related art of FIG. 1.

The present invention provides a current source inverter capable of safely and surely stopping if an abnormality occurs in a circuit such as a gate driver.

According to an aspect of the present invention, the current source inverter includes an inverter unit having arm units and AC terminals, the numbers of the arm units and AC terminals being dependent on an AC load connected to the AC terminals, each of the arm units having an upper arm and a lower arm, the upper arm being connected between a positive DC terminal and the corresponding AC terminal and having an upper arm switch and an upper arm diode, the lower arm being connected between a negative DC terminal and the corresponding AC terminal and having a lower arm switch and a lower arm diode. The apparatus also includes a smoothing reactor and a DC power source that are connected in series between the positive DC terminal and the negative DC terminal. The apparatus further includes drivers configured to control ON/OFF of the upper and lower arm switches in such a way as to output AC power to the AC terminals. At least one of the upper arm switches and at least one of the lower arm switches are each a normally-ON switch.

DESCRIPTION OF THE PREFERRED EMBODIMENTS

Current source inverters according to embodiments of the present invention will be explained in detail with reference to the drawings.

Embodiment 1

Figure 1:
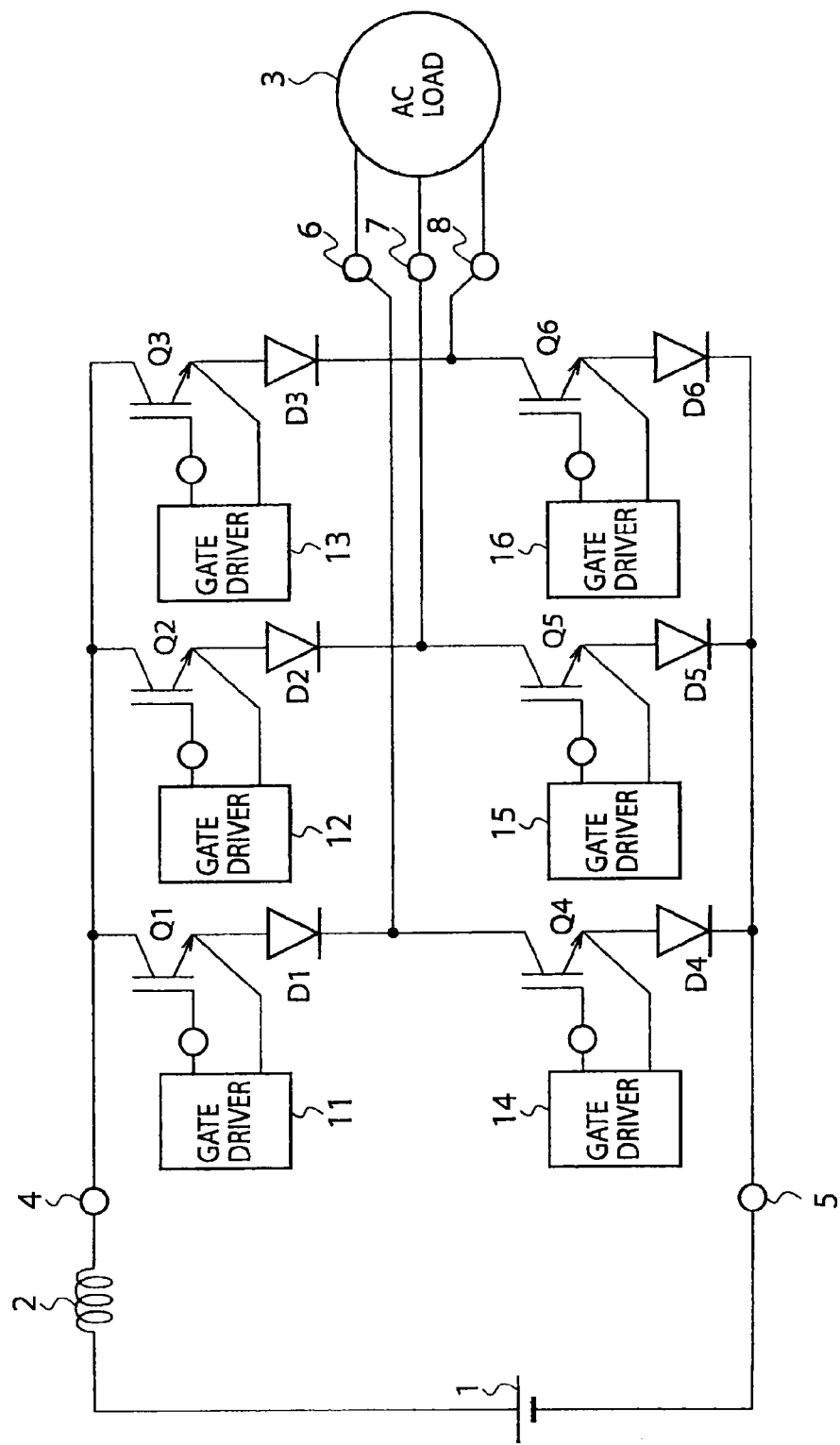
FIG. 1 is a circuit diagram illustrating a current source inverter according to a related art.
Figure 2:
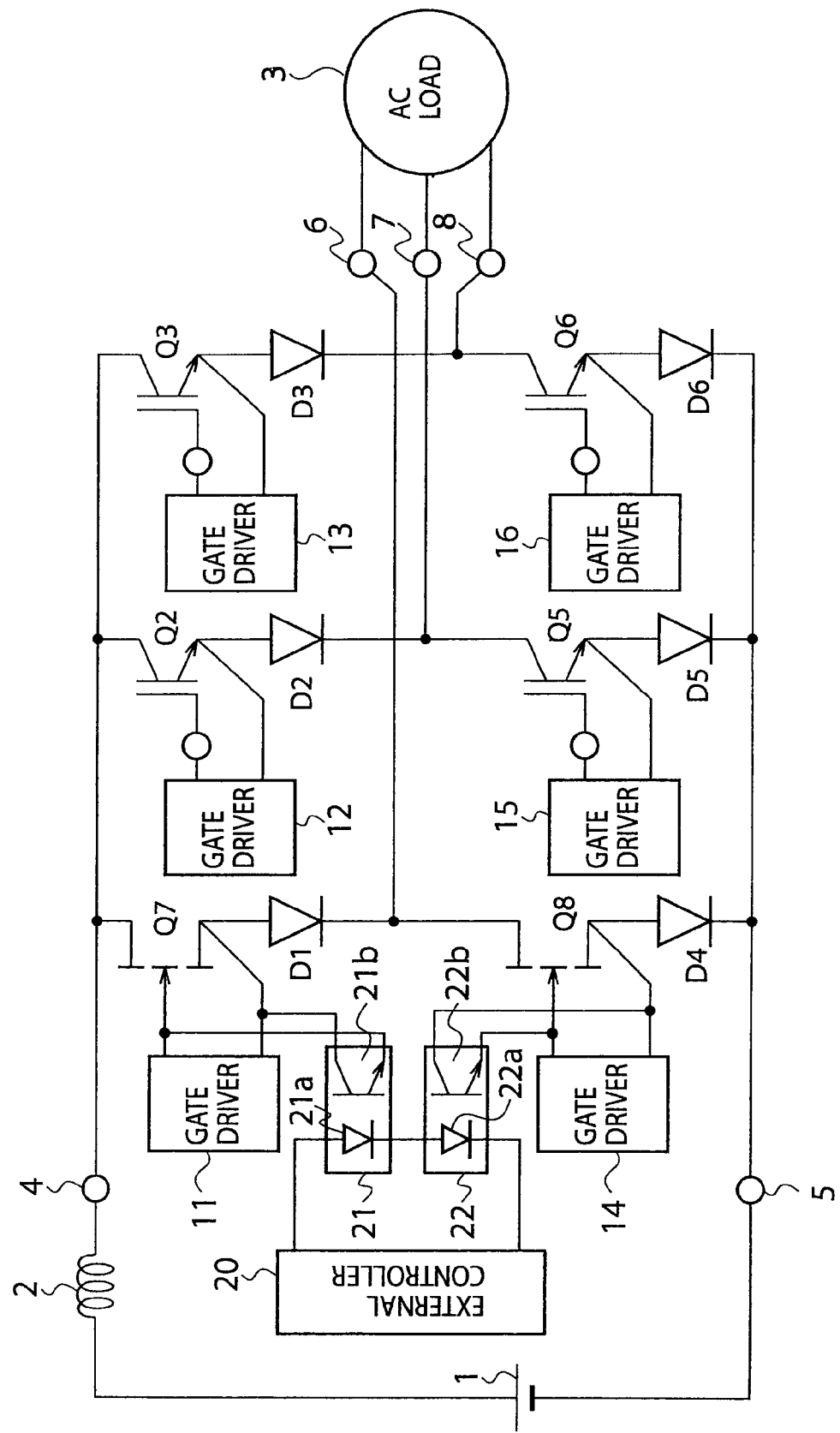
FIG. 2 is a circuit diagram illustrating a current source inverter according to Embodiment 1 of the present invention.

FIG. 2 is a circuit diagram illustrating a current source inverter according to Embodiment 1 of the present invention. Connected between a positive DC terminal 4 and an AC terminal (u-phase AC terminal) 6 is a series circuit including a normally-ON switch (upper arm switch) Q7 and a diode (upper arm diode) D1. Connected between the positive DC terminal 4 and an AC terminal (v-phase AC terminal) 7 is a series circuit including an IGBT (upper akin switch) Q2 and a diode (upper arm diode) D2. Connected between the positive DC terminal 4 and an AC terminal (w-phase AC terminal) 8 is a series circuit including an IGBT (upper arm switch) Q3 and a diode (upper arm diode) D3. Each pair of the upper arm switch and upper arm diode forms an upper arm.

Connected between a negative DC terminal 5 and the AC terminal 6 is a series circuit including a normally-ON switch (lower arm switch) Q8 and a diode (lower arm diode) D4. Connected between the negative DC terminal 5 and the AC terminal 7 is a series circuit including an IGBT (lower arm switch) Q5 and a diode (lower arm diode) D5. Connected between the negative DC terminal 5 and the AC terminal 8 is a series circuit including an IGBT (lower arm switch) Q6 and a diode (lower arm diode) D6. Each pair of the lower arm switch and lower arm diode forms a lower arm.

Each pair of the upper arm and lower arm forms an arm unit. An AC load 3 connected to the current source inverter is a 3-phase load, and therefore, the apparatus is provided with the 3-phase inverter unit having the three arm units and three AC terminals.

Connected between the positive DC terminal 4 and the negative DC terminal 5 is a series circuit including a smoothing reactor 2 and a DC power source 1. Gate drivers 11 to 16 control ON/OFF of the normally-ON switches Q7 and Q8 and the IGBTs Q2, Q3, Q5, and Q6, which are normally-off switches, in such a way as to supply 3-phase AC power to the AC terminals 6 to 8.

The normally-ON switches Q7 and Q8 are made of wide-band-gap semiconductor such as silicon carbide (SiC) or gallium nitride (GaN) and turn on with a gate-source voltage of 0 V. The normally-ON switches Q7 and Q8 are in an ON state with a gate-source voltage of +15 V and in an OFF state with a gate-source voltage of −10 V.

Compared with silicon, the wide-band-gap semiconductor is easy to make a normally-ON device. According to the present embodiment, the switches Q7 and Q8 are normally-ON switches. Instead, the present invention is achievable if at least one of the switches Q7, Q2, Q3 and at least one of the switches Q8, Q5, and Q6 are each a normally-ON switch.

An external controller 20 outputs, to photocouplers 21 and 22, a command signal to short-circuit a gate (control terminal) and source (one of two main terminals) of each of the normally-ON switches Q7 and Q8. A photodiode 21a of the photocoupler 21 and a photodiode 22a of the photocoupler 22 are connected in series and ends of the series circuit are connected to ends of the external controller 20.

A phototransistor 21b of the photocoupler 21 has a collector connected to the source of the normally-ON switch Q7 and an emitter connected to the gate of the normally-ON switch Q7. A phototransistor 22b of the photocoupler 22 has a collector connected to the source of the normally-ON switch Q8 and an emitter connected to the gate of the normally-ON switch Q8. The external controller 20 and photocouplers 21 and 22 form a protection circuit.

Operation of the current source inverter according to the present embodiment will be explained.

In a normal state, the gate drivers 11 to 16 apply voltages of +15 V and −10 V to the gates of the normally-ON switches Q7 and Q8 and the gates of the IGBTs Q2, Q3, Q5, and Q6, to turn on and off these switches in such a way as to supply 3-phase AC power to the AC terminals 6, 7, and 8.

If an abnormality occurs in the gate drivers 11 to 16 or in a control circuit (not illustrated), the external controller 20 applies a command signal to the photodiodes 21a and 22a, to let the photodiodes 21a and 22a emit light. Then, the phototransistor 21b passes a current through a path between the gate and source of the normally-ON switch Q7, thereby short-circuiting the gate and source of the normally-ON switch Q7. As a result, the normally-ON switch Q7 has a gate-source voltage of 0 V and turns on.

At the same time, the phototransistor 22b passes a current through a path between the gate and source of the normally-ON switch Q8, thereby short-circuiting the gate and source of the normally-ON switch Q8. As a result, the normally-ON switch Q8 has a gate-source voltage of 0 V and turns on.

As a result, energy accumulated in the smoothing reactor 2 is returned to the DC power source 1 through a path extending along Q7, D1, Q8, D4, and DC power source 1. Namely, the energy of the smoothing reactor 2 never breaks down the normally-ON switches Q7 and Q8 and IGBTs Q2, Q3, Q5, and Q6, so that the current source inverter is safely and surely stopped when an abnormality occurs in the gate drivers 11 to 16 or in the control circuit (not illustrated).

Embodiment 2

Figure 3:
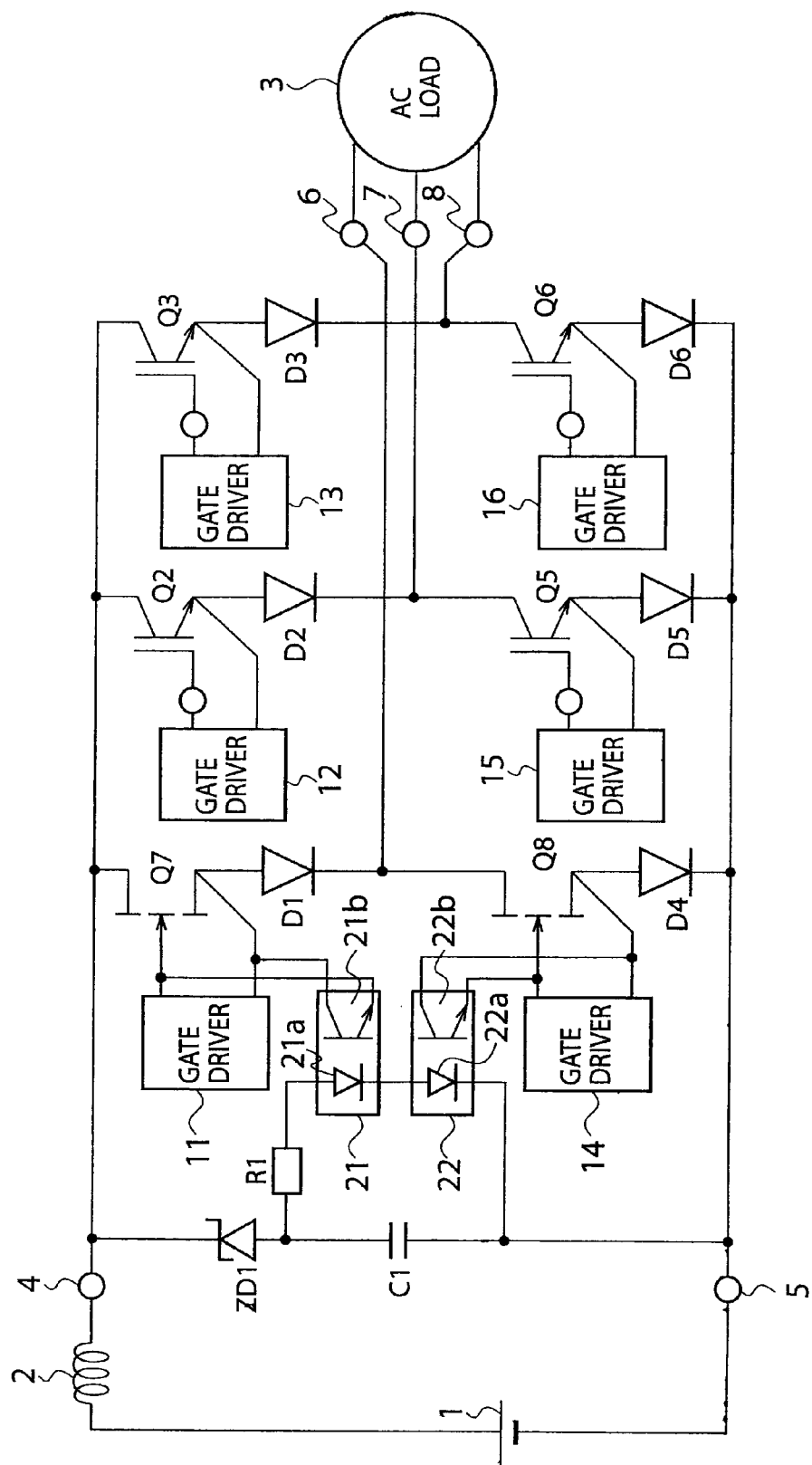
FIG. 3 is a circuit diagram illustrating a current source inverter according to Embodiment 2 of the present invention.

FIG. 3 is a circuit diagram illustrating a current source inverter according to Embodiment 2 of the present invention. Embodiment 2 employs, instead of the external controller 20 of Embodiment 1, a series circuit including a Zener diode ZD1 and a capacitor C1 connected between a positive DC terminal 4 and a negative DC terminal 5 and connects a series circuit including a resistor R1 and photodiodes 21a and 22a to ends of the capacitor C1.

The remaining configuration of Embodiment 2 is the same as that of Embodiment 1 illustrated in FIG. 2, and therefore, like parts are represented with like reference marks to omit a repetition of explanation.

Operation of the current source inverter according to the present embodiment will be explained. If an abnormality occurs in gate drivers 11 to 16 or in a control circuit (not illustrated), normally-ON switches Q7 and Q8 and IGBTs Q2, Q3, Q5, and Q6 turn off, to accumulate large energy in a smoothing reactor 2.

At this time, the Zener diode ZD1 detects a voltage between the positive DC terminal 4 and the negative DC terminal 5, and if the detected voltage exceeds a Zener breakdown voltage, breaks down to pass a current through the resistor R1 and the photodiodes 21a and 22a, which emit light.

Operation that follows is the same as that of Embodiment 1. Accordingly, the current source inverter of Embodiment 2 provides the same effect as Embodiment 1.

The present invention is not limited to Embodiments 1 and 2. Although each of the current source inverters of Embodiments 1 and 2 employs the 3-phase configuration, the present invention is also applicable to single-phase current source inverters. The numbers of the arm units and AC terminals is adapted to an AC load connected to the AC terminals. The single-phase current source inverter is formed by eliminating the gate drivers 13 and 16, IGBTs Q3 and Q6, diodes D3 and D6, and AC terminal 8 from any one of the apparatuses illustrated in FIGS. 2 and 3.

In this way, the current source inverter according to an aspect of the present invention turns on the normally-ON switches if an abnormality occurs in, for example, the gate drivers, to return energy accumulated in the smoothing reactor to the DC power source through the normally-ON switches. As a result, the energy of the smoothing reactor never destroys the upper and lower arm switches. The apparatus, therefore, can safely and surely be stopped if an abnormality occurs in the gate drivers or in other elements.

The present invention is applicable to motor driving inverters, uninterrupted power sources, power factor correction circuits, and the like.

This application claims benefit of priority under 35 USC §119 to Japanese Patent Application No. 2009-297859, filed on Dec. 28, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A current source inverter comprising:

an inverter unit having arm units and AC terminals, the numbers of the arm units and AC terminals being adapted to an AC load connected to the AC terminals, each of the arm units having an upper arm and a lower arm, the upper arm being connected between a positive DC terminal and the corresponding AC terminal and having an upper arm switch and an upper arm diode, and the lower arm being connected between a negative DC terminal and the corresponding AC terminal and having a lower arm switch and a lower arm diode;

a smoothing reactor and a DC power source that are connected in series between the positive DC terminal and the negative DC terminal; and drivers configured to control ON/OFF of the upper and lower arm switches so that AC power is outputted to the AC terminals, wherein at least one of the upper arm switches and at least one of the lower arm switches is each a normally-ON switch; and a protection circuit configured to short-circuit a control terminal of the normally-ON switch and one of two main terminals of the normally-ON switch to turn on the normally-ON switch in a case of a detected abnormality of the current source inverter to stop the operation of the current source inverter, wherein the abnormality occurs as a control circuit of the inverter unit or the drivers malfunctions to lead the inverter unit to inoperative, and wherein the protection circuit controls a phototransistor to short-circuit the control terminal and main terminal of the normally-ON switch upon detecting the abnormality of the current source inverter according to an external command or a voltage between the positive and negative DC terminals so that a current path extending along the smoothing reactor, the normally-ON switch, and the DC power source is formed.

2. The current source inverter according to claim 1, wherein the normally-ON switch is made of wide-band-gap semiconductor.

\* \* \* \* \*